United States Patent Office 3,064,069
Patented Nov. 13, 1962

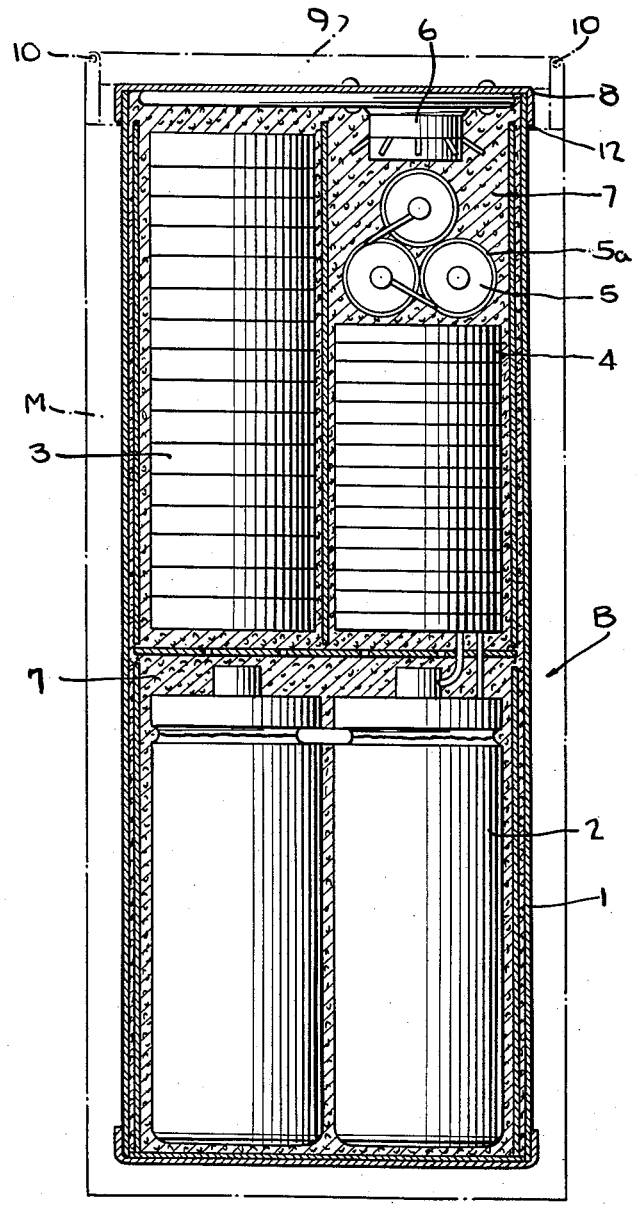

3,064,069
SHOCKPROOF INSULATED BATTERY PROCESS
AND PRODUCT
Henri Paul Augé, Poitiers, France, assignor to Societe des Accumulateurs Fixes et de Traction (Societe Anonyme), Romainville, France, a company of France
Filed Sept. 7, 1960, Ser. No. 54,394
Claims priority, application France Sept. 8, 1959
8 Claims. (Cl. 136—173)

The present invention relates to the protection and the insulation of the parts of batteries, and more especially of batteries including multiple diverse internal components all provided within a casing.

It is already known, in order to hold the parts or internal components of a battery while protecting them against impacts and vibrations, to make use of supports placed in the casing of the battery. The vacant spaces or voids in these known arrangements are packed with several pieces of impregnated cardboard, or Rubberoid or cut sheets of plastic materials. With such practice, the battery thus obtained cannot be expected with certainty to possess all the desired and needed mechanical properties. The known filling materials are unevenly distributed and do not present a mechanical resistance both well determined and evenly distributed in every direction to the relative movements of the internal parts or components and the casing. Moreover, fully satisfactory operation also requires the filling material to insure a complete insulation between the several parts or components of the battery and also with the outside casing and that it promote the leakproof tightness of the battery. These requirements are not satisfactorily met in the known arrangements and known filling materials.

An object of the present invention is to provide a leakproof battery unaffected by impacts or vibrations of any kind.

Another object of the invention is to provide a battery the casing of which and the several internal parts or components which are contained in it constitute in effect a single body with a novel filling material placed in the casing.

Still another object of the invention is the production of a battery in which the battery casing and everything within this casing are perfectly integrated into one unit mechanically.

An additional object of the invention is also to provide a battery in which casing, parts and insulating filling material make up one mechanical unit without substantially increasing the weight of the whole.

The present invention therefore comprises a process for assembling the parts or components of a battery in its casing so that a perfect electrical insulation is obtained and the tightness as well as the mechanical resistance of the unit is ensured without substantially increasing its weight. This process comprises pouring into the battery casing the components of a plastic foam the volume of which increases as it is being generated, introducing into the casing as soon as the foam begins to generate and swell the parts, components and elements constituting the battery in the relative positions that they must occupy, then closing the casing with a cover and maintaining the cover in closed condition on the casing in order to counteract the pressure caused by the swelling of the foam, and thereafter welding or otherwise permanently securing the cover on the casing after the foam has cooled.

Yet a further object of the invention is a battery derived by this process.

In this way a cushion for the battery components comprising a rigid low-density foam is obtained, said cushion being created in the casing, the internal parts or components being surrounded, held and maintained by the foam while it swells and cools, and being set into a rigid unitary structure when the foam has cooled. The battery obtained by this process presents all the required and desired qualities as to mechanical protection, i.e. rigidity and shockproof support of the components within the casing, tightness and electrical insulation between components themselves and with the casing.

Other advantages and characteristics of the invention will become apparent from the following specification and the accompanying drawing wherein the single FIGURE shows as an example and diagrammatically an embodiment of the invention.

Referring to the drawing, the casing 1 of a battery B is shown in the example as made of metal. In this casing 1 are provided several battery elements, components or parts. For example, there are included cylindrical cells 2. These cylindrical cells 2 are shown in the figure as being parallel-connected. Above these cells 2 is a first flat type battery 3 and a second flat cell type battery 4 of a different kind. In addition polarization cells 5 are included in the casing 1. These cells 5 are shown as series-connected and are enveloped as by polyvinyl tubes 5a. These various cells and batteries within the casing 1 are intended to be electrically connected to a load (not shown) through a connector plug receiving socket 6 also within the casing 1. All these parts or components are held and embedded within the bulk or body of a rigid plastic foam 7 which holds them in their intended positions within the casing 1 and protects them against impacts.

The said foam may be obtained for instance by heating granulated particles if it is made of polyethylene or by mixing polyesters and cyanates in order to obtain polyurethane. It is important that the foam be produced without substantial increase of the temperature by controlling for that purpose either the heating which is to cause the reaction or the emission of calories of an exothermic reaction. Moreover, in order that the insulating properties of the foam remain unaffected, any trace of free water in the materials used in its formation must be carefully avoided.

To satisfy such conditions, it is advantageous to make use of polyurethane foams made in situ from two components easily obtained commercially. After a thorough mixing of these components, carbon dioxide is evolved and a condensation reaction takes place producing the desired foams. The foams thus obtained when cooled are rigid, have a low density and are chemically neutral towards metals such as zinc or tin.

As an example the following method has been used:

The components in use are polyester such as the product known under the registered trademark "Daltolac 22 or 24," substantially containing polyester, and isocyanate in the proportions of a hundred parts of polyester in volume, for a hundred parts of isocyanate (such as diisocyanatodiphenylmethan) volumetrically determined and respectively heated at 30/35° C. and 20/25° C., temperatures which have been found as optimum for the present use. The heated components are then mixed together and stirred. This mixing must be made in the shortest time possible and very thoroughly. The usual time of mixing and stirring is about 3 minutes if stirred by hand, but may be shortened to 30 seconds if an efficient mechanical stirrer is used. As soon as the mixture begins to swell, the stirring is stopped.

This mixture is poured in a still fluid state into the open casing 1 of the battery B located within a mold M and the constituent parts 2–6 inclusive of the said battery are quickly put in their places in said casing, the electrical connections between these parts having previously been made. The fluid mixture in the casing penetrates all voids within the latter and between the parts 2–6 inserted into the casing 1, and a foam is generated by the chemical reaction of the mixture which takes about 3 to 5 minutes at the temperatures mentioned above. Since the foam while being generated within the casing 1 exerts a strong pressure upon the walls of said casing, the latter should be previously placed in a mold M. A cover 8 is then applied over the open end of casing 1. This cover must be maintained in a closed position on the casing. For this purpose a detachable brace 9 is used, said brace being preferably linked to the mold M at 10 in order to counteract the pressure which is exerted on the cover 8 while the foam within the casing is swelling. Naturally the amount of foam producing mixture poured into the casing 1 is previously determined. It depends upon the volume of the casing and on the spaces or voids which must be filled with foam between the parts of the battery. Gas generated during formation of the foam escapes at the cover 8. In its formation and swelling the foam penetrates all voids within the casing.

When the formation of the foam is complete and the foam has cooled and become rigid, the cover 8 may be welded at 12 or otherwise permanently secured to the casing 1. Then the brace 9 is removed and the battery B is taken out of the mold M. The unit B thus obtained acts as one piece, being quite leakproof, and the elements inside, embedded and locked in the mass of now rigid foam 7 are unaffected by impacts or vibrations of any amplitude or frequency, and are not altered by the environmental atmospheric state. Moreover the foam 7 is inert towards the constituents of the embedded parts 2–6 around which it stands. It also is non-conductive and insulates the parts from each other. Lastly the density of the foam 7 is very low. The saving in weight thus is appreciable in a battery. It may be noted also that with the process according to the invention it is not necessary to seal the battery B with any wax.

The present invention thus relates to a process for assembling and holding the parts of a battery in the casing of the said battery while ensuring a perfect insulation, the tightness and mechanical strength of the unit without substantially increasing its weight, and to a battery obtained by this process. Although specific embodiments are disclosed, variations within the scope of the appended claims are possible and are contemplated. There is no intention of limitation to the exact disclosure herein made.

What is claimed is:

1. That improvement in manufacturing batteries constituted of multiple components within a casing comprising providing an open casing, assembling the multiple components of the battery into the arrangement they are to be disposed within the casing, providing an anhydrous foam generating mixture of material that is neutral to the components of the battery and whose foam is settable after generation, pouring this mixture into said casing, then while foam is being generated thereby within said casing, inserting the assembled components into the foaming mixture within said casing, such insertion effecting displacement and penetration of the foaming mixture into voids and spaces between the assembled components within the casing, then covering said casing with a cover, maintaining the cover is clamped closed condition on said casing with a clamping force sufficient to resist the forces of expansion created by the generation of foam from said foaming mixture and until foaming thereof has ceased and the generated foam has rigidly set and thereafter permanently attaching the cover in its closed condition to said casing.

2. The improvement of claim 1, wherein the foam forming mixture is selected from the group consisting of heated granulated polyethylene and a heated liquid mixture of polyurethane foam forming materials.

3. The improvement of claim 1, wherein the foam forming mixture is selected from the group consisting of heated granulated polyethylene particles and a heated liquid mixture of polyester and cyanates that react to produce polyurethane foam, and wherein the mixture is poured into the casing as a liquid at a temperature of from 30 to 35° C., the foam generated by such mixture setting upon cooling to conventional room temperature.

4. That improvement in manufacturing batteries constituted of multiple individual components within a casing comprising providing an open casing, mounting said casing in a temporary supporting mold, assembling the multiple components of the battery into the arrangement they are to be disposed within the casing, providing an anhydrous, low density, foam forming liquid mixture that is neutral to the components of the battery, the generated foam being capable of setting after its generation, pouring this mixture into the casing and as foam is generated thereby within said casing and before it sets, inserting the assembled components into the casing, providing a cover closure for the casing, clamping said closure into closing condition on said casing and maintaining this clamped condition until generation of foam from the mixture within the casing is complete and the foam has rigidly set, the foam in its generation penetrating the voids and spaces between the components inserted into said casing and upon its setting effecting rigid embedment of the said components therein in non-displaceable positions relative to the casing, and thereafter permanently securing said cover in its closed condition to said casing and then removing the completed battery from said temporary supporting mold.

5. That improvement in manufacturing batteries constituted of multiple individual components within a metallic casing comprising providing an open metallic casing, mounting said casing in a temporary supporting mold, assembling the multiple components of the battery externally of the casing into the arrangement that they are to be disposed within the casing, preparing an anhydrous, low density foam forming heated liquid mixture from polyester and cyanate that will generate polyurethane foam which latter will set upon cooling, pouring this heated mixture into said casing upon its preparation and as the foam begins to be generated thereby, immediately thereafter inserting the assembled components into the mixture containing casing while the foam is being generated therein, providing a cover, closing the casing with said cover and applying clamping pressure ot the cover and casing so as to resist the forces of expansion developed by the foam as it is generated within said casing, the developing and expanding foam within the casing penetrating the voids and spaces between components within the closed casing, said clamping pressure being maintained until generation of the foam has ceased and the foam has cooled and set, thereafter permanently securing the cover to the casing in its closed condition and then removing the resultant battery from said mold, the foam in its set condition effecting light weight rigid embedment and non-shiftable support of the individual components within the closed casing as well as electrical insulation of said components from each other.

6. A multiple component battery comprising a casing, multiple separate components disposed within the casing in predetermined arrangement with spaces and voids between the components and casing, a cover closing the casing and permanently secured thereto in closing position, and a set substantially rigid, anhydrous foam of material neutral to all the components within the casing, and having been previously subjected to elastic pressure, said foam penetrating said spaces and voids between the components and the casing to provide in effect a unitary structure consisting of the foam embedded components within said casing.

7. A multiple component battery comprising a casing, multiple separate components disposed within the casing in predetermined positions with spaces and voids between the components and casing, a cover closing the casing and permanently secured thereto in its closing condition, and an anhydrous, set rigid foam of material neutral to all the components of the closed casing, and having been previously subjected to elastic pressure, said foam penetrating the spaces and voids between the components and the casing to provide in effect a unitary rigid structure consisting of foam embedded components within the casing that are precluded from displacement by the foam as well as being insulated from each other thereby, said foam being selected from the group consisting of polyethylene and polyurethane foams.

8. A multiple component battery comprising a metallic casing, multiple separate components disposed within the casing in predetermined positions with spaces and voids between the components and casing, a metallic cover closing the casing and permanently secured thereto in its closing condition, and an anhydrous, set rigid foam of material neutral to all the components with the closed casing, and having been previously subjected to elastic pressure, said foam penetrating the spaces and voids between the components and the casing to provide in effect a unitary rigid structure consisting of foam embedded components within the casing that are precluded from displacement by the foam as well as being insulated from each other thereby, said foam being selected from the group consisting of polyehtylene and polyurethane foams.

References Cited in the file of this patent

UNITED STATES PATENTS

| | | |
|---|---|---|
| 1,239,835 | Smith | Sept. 11, 1917 |
| 1,481,583 | Anundi | Jan. 22, 1924 |
| 2,346,695 | Miller | Apr. 18, 1944 |
| 2,895,603 | Freeman | July 21, 1959 |